United States Patent [19]

MacMillan

[11] Patent Number: 4,907,379
[45] Date of Patent: Mar. 13, 1990

[54] SHOT BLASTING MACHINERY

[75] Inventor: William R. MacMillan, Altrincham, England

[73] Assignee: Tilghman Wheelabrator Ltd., United Kingdom

[21] Appl. No.: 253,313

[22] PCT Filed: Jan. 17, 1986

[86] PCT No.: PCT/GB86/00032
§ 371 Date: Aug. 29, 1986
§ 102(e) Date: Aug. 29, 1986

[87] PCT Pub. No.: WO86/04289
PCT Pub. Date: Jul. 31, 1986

Related U.S. Application Data

[63] Continuation of Ser. No. 921,087, Aug. 29, 1986, abandoned.

[30] Foreign Application Priority Data

Jan. 19, 1985 [GB] United Kingdom ............... 85 01386

[51] Int. Cl.[4] .............................................. B24C 03/14
[52] U.S. Cl. ...................................... 51/426; 51/417;
51/421; 51/425; 51/432
[58] Field of Search ................. 51/410, 417, 418, 419,
51/420, 421, 425, 426, 432, 434, 436

[56] References Cited

U.S. PATENT DOCUMENTS

| | | | |
|---|---|---|---|
| 2,118,832 | 5/1938 | Wean et al. | 51/432 X |
| 2,131,767 | 10/1938 | Turnbull | 51/432 X |
| 2,131,770 | 10/1938 | Turnbull | 51/419 |
| 2,252,823 | 8/1941 | Wallace | 51/418 X |
| 2,454,158 | 11/1948 | Gossard | 51/421 |
| 2,770,924 | 11/1956 | Mead et al. | 51/425 |
| 3,160,991 | 12/1964 | Bradley | 51/426 |
| 4,329,819 | 5/1982 | May | 51/432 |
| 4,333,278 | 6/1982 | Schulte et al. | 51/434 |
| 4,395,851 | 8/1983 | Watts | 51/434 |
| 4,447,993 | 5/1984 | Laido | 51/434 X |
| 4,449,331 | 5/1984 | MacMillan | 51/426 X |

FOREIGN PATENT DOCUMENTS

| | | |
|---|---|---|
| A 10060637 | 9/1982 | European Pat. Off. . |
| 71824 | 1/1893 | Fed. Rep. of Germany . |
| 472246 | 9/1937 | United Kingdom . |
| 920488 | 3/1963 | United Kingdom . |

Primary Examiner—Robert P. Olszewski
Attorney, Agent, or Firm—Niro, Scavone

[57] ABSTRACT

A shot blasting machine including a blast cabinet having at least one internal abrasive throwing wheel rotatably mounted therein and directly coupled to a driving motor mounted externally on one wall of the blast cabinet. The opposed wall of the blast cabinet has mounted thereon externally of the blast cabinet an abrasive delivery spout and funnel for the throwing wheel disposed immediately adjacent to the throwing wheel, so that the blast cabinet also functions as a hood for the throwing wheel. The machine may have a workpiece passage across the width of the blast cabinet; a workpiece passage along the length of the blast cabinet; a rotating table for supporting workpieces, the axis of rotation of the table being within the blast cabinet and the table being housed within an openable casing fitted to the blast cabinet; or a plurality of different workpiece passage configurations or supports.

18 Claims, 6 Drawing Sheets

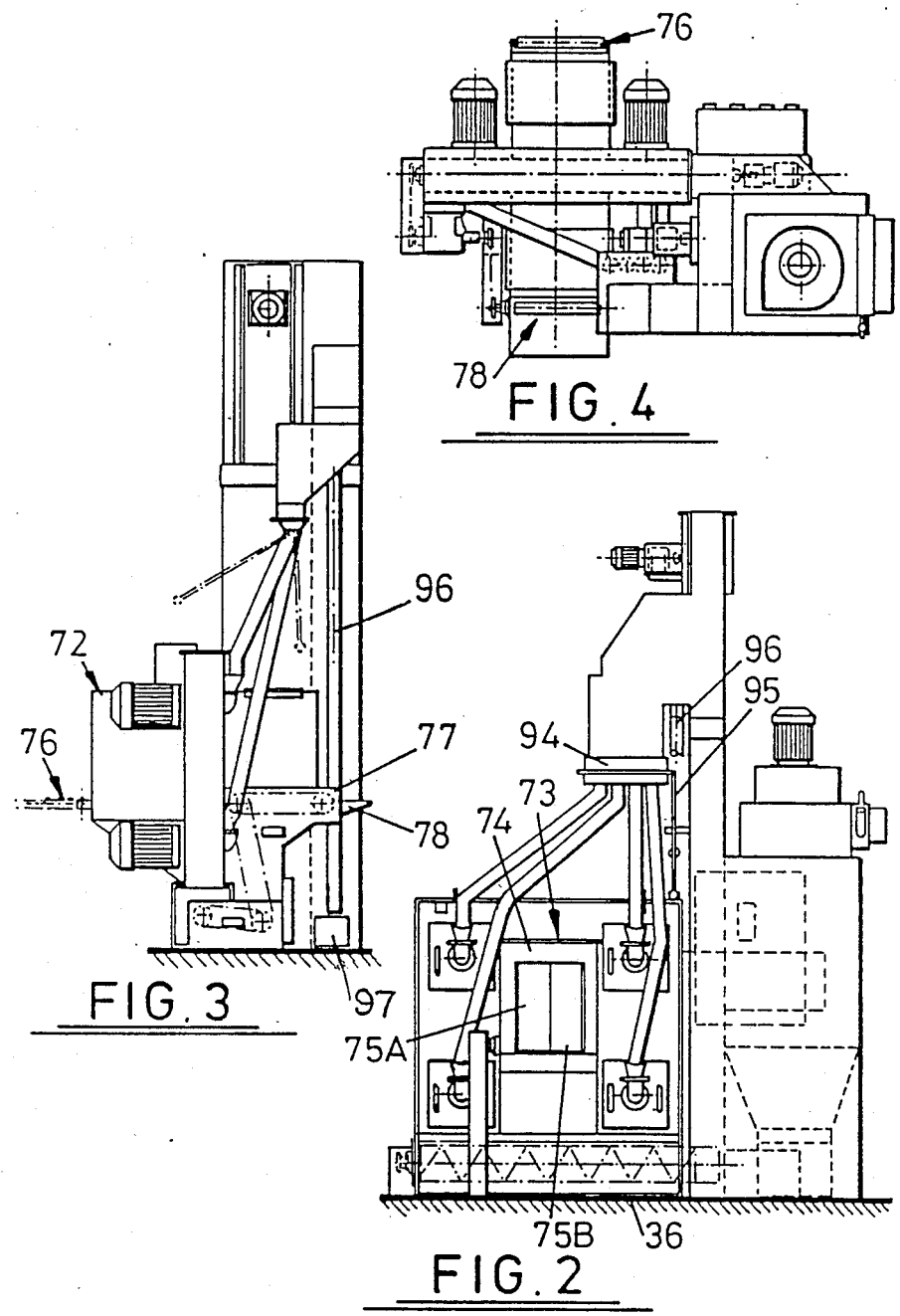

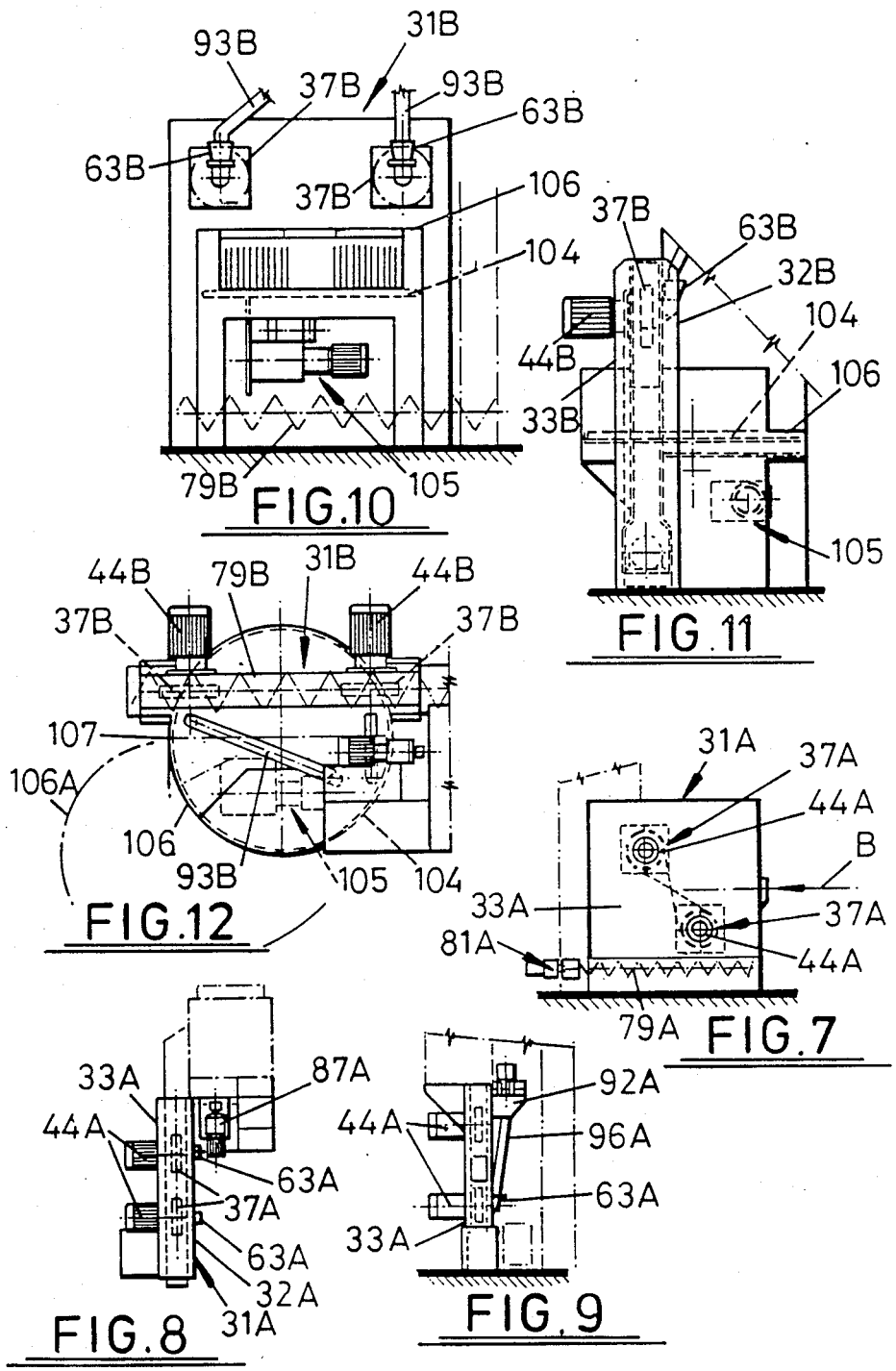

SHOT BLASTING MACHINERY

This application is a continuation of Ser. No. 921,087 filed Aug. 29, 1986 (now abandoned).

This invention relates to shot blasting machinery.

There are many engineering and metal fabricating facilities where shot blasting is required but where, for various reasons such, for example, as cost of machinery or relatively short time per day or week of actual usage, there is no in-house shot blasting facility. Such engineering or metal fabricating facilities generally send out their metal work to firms which contract to do this shot blasting work. This is often not satisfactory in that production of a particular job must stop until the shot blasted work returns and moreover it is relatively costly transporting the work to and from the shot blasting contractors and also, of course, paying for the shot blasting work to be done.

It is an object of the present invention to provide a shot blasting machine which would be suitable, particularly in cost, for said engineering and metal fabricating facilities.

According to the present invention there is provided a shot blasting machine comprising a blast cabinet having at least one internal abrasive throwing wheel rotatably mounted therein and directly coupled to a driving motor mounted externally on one wall of the blast cabinet with an opposed wall of the blast cabinet having mounted thereon externally of the blast cabinet abrasive delivery means for the throwing wheel and being disposed immediately adjacent to the throwing wheel, whereby the blast cabinet also functions as a hood for the throwing wheel.

BRIEF DESCRIPTION OF THE DRAWINGS

Embodiments of the present invention will now be described, by way of example, with reference to the accompanying drawings, in which:

FIG. 2 is a side elevation of the machine;

FIG. 3 is an end elevation of the machine;

FIG. 4 is a plan view of the machine;

FIGS. 7 to 9 are respectively a side view, an end view and a plan view of an alternative blast cabinet;

FIGS. 10 to 12 are respectively a side view, an end view and a plan view of yet another blast cabinet in which a rotatable table is used to present the workpiece to the throwing wheels for shot blasting;

DESCRIPTION OF THE PREFERRED EMBODIMENT

The shot blasting machine according to FIGS. 1 to 6 comprises a blast cabinet module 28 connected to, and communicating with, at its bottom an abrasive and contaminant (debris) separation and dust collector module 30.

The blast cabinet module 28 comprises a blast cabinet 31 possibly formed of maganese to avoid the provision of internal hard metal wearplates as is common in shot blasting machines but which may be formed of other metal with or without wearplates.

The blast cabinet 31 is relatively narrow in terms of width, about the width of a conventional wheel hood appropriate in dimensions to an abrasive throwing wheel employed in the blast cabinet.

This narrowness in blast cabinet width is a major distinctive characteristic of the blast cabinet 31 of a shot blasting machine according to this invention, and is achieved, as will be detailed hereafter, by locating the throwing wheel driving motor external of the blast cabinet 31 on one wall of the latter and the abrasive feed arrangement again external of the blast cabinet 31 on the opposed wall thereof aligned with the driving motor.

Figure 1:
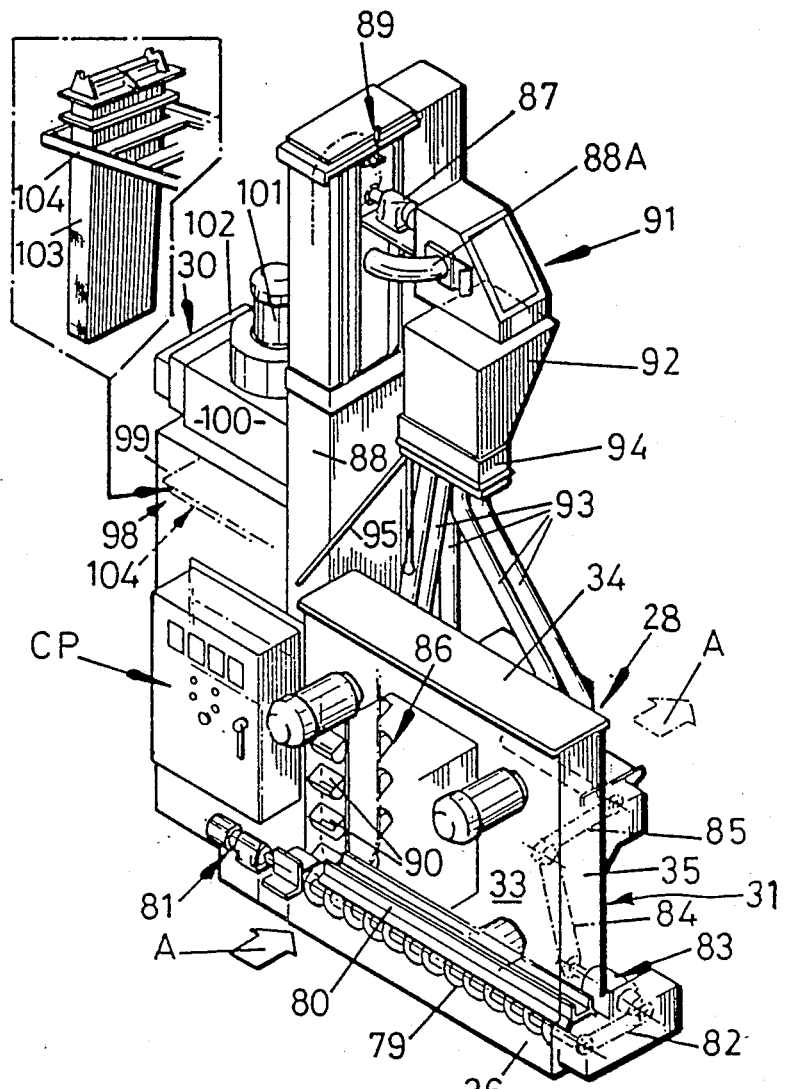
FIG. 1 is a perspective view of a shot blasting machine according to the present invention.
Figure 5:
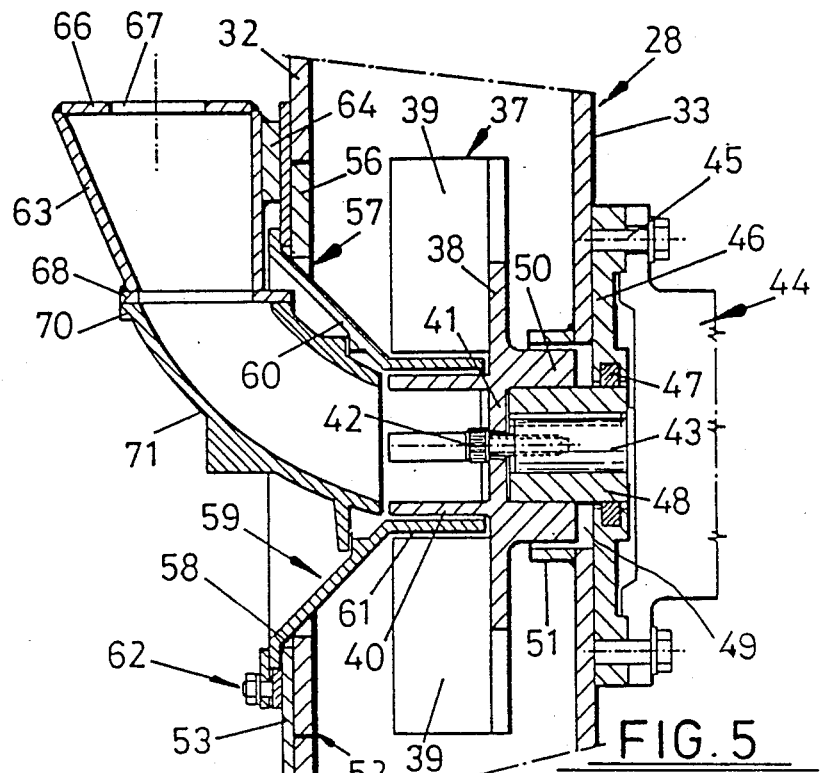
FIG. 5 is a fragmentary sectional view, to an enlarged scale, of the blast cabinet of the machine.
Figure 6:
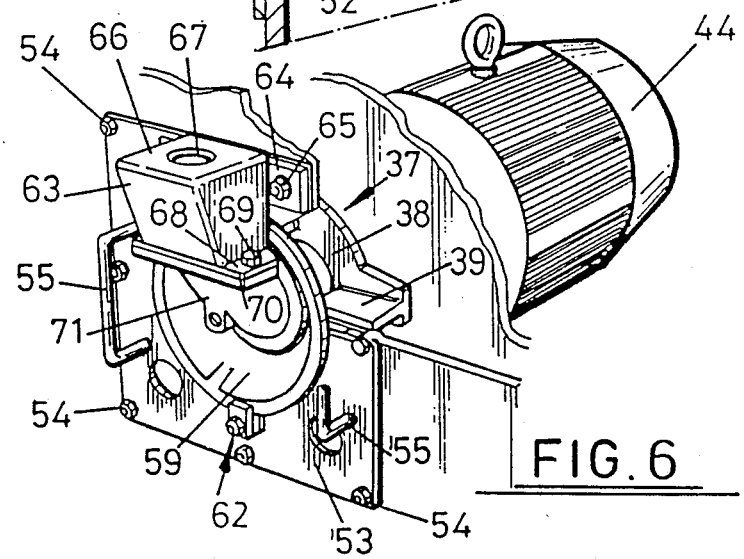
FIG. 6 is a perspective view, again to an enlarged scale, of part of the blast cabinet, abrasive feed and throwing wheel driving motor.

Reference is now particularly directed to FIGS. 5 to 6.

The blast cabinet 31 has two opposed major walls 32, 33 joined at the top by a roof 34, at the ends by end walls 35, and at the bottom by a floor 36 (see FIGS. 1 to 4).

Abrasive throwing wheels 37 are rotatably mounted within the blast cabinet 31. In this instance, there are for such throwing wheels 37, two above and two below the traverse passage for a workpiece as will be described later.

Each throwing wheel 37 is as disclosed in U.S. Pat. No. 4,723,379 and generally is a one-piece, bi-directional throwing wheel comprising a single side or backplate 38 with integral angularly-spaced throwing blades 39 and a central vaned impellor 40 with integral centreplate 41.

The centreplate 41 is bolted as indicated at 42 directly onto the output shaft 43 of an electric drive motor 44. The motor 44 is bolted, as indicated at 45, onto an annular plate 46 welded to the outside of blast cabinet wall 33.

A seal ring 47 to resist abrasive egress is located between the internal diameter of the annular plate 46 and a bush 48 extending through an aperture 49 in the wall 33 and keyed to the motor spindle 43, which bush 48 engages in a recessed seating formation 50 on the backside of the throwing wheel backplate 38.

An annular flange 51 is welded onto the inside of the wall 33 around the aperture 49 and spatially surrounds the formation 50 on the throwing wheel backplate 38 to provide a labyrinth path serving also to resist egress of abrasive out of the aperture 49 with the ring seal 47.

The blast cabinet wall 32 is apertured at 52, which aperture 52 is closed by a plate 53 bolted as indicated at 54 to the wall 32. This plate 53 is formed with lifting handles 55 to facilitate its removal (after unbolting) or fixing in position (for bolting). The plate 53 has welded on its inner surface a rectangular projection or frame 56 defining a rectangular aperture 57. The rectangular projection or frame 56 serves to locate the plate 53 precisely in the aperture 52.

The plate 52 is formed with a circular aperture 8 closed by a control cage generally indicated at 59 having a tapered inlet 60 extending through the apertures 52, 58 and 57 into the blast cabinet 31 and terminating in a cylindrical slotted control cage 61 surrounding the impellor 40. The control cage 61 is removably secured in position by three angularly-spaced bolted clamps 62 on the plate 53.

An abrasive feed funnel 63 is provided external of the wall 32 and is welded to a bar 64 bolted onto the plate 53 as indicated at 65. The feed funnel 63 is closed at its top by a welded plate 66 save for a circular hole 67 which provides an inlet for abrasive.

The feed funnel 63 has a bottom flange 68 by means of which it is bolted as indicated at 69 to the top flange 70 of a feed spout 71. The latter extends into the control cage 59 stopping just short of the cylindrical portion 61 thereof.

From the above the distinctive characteristic of the blast cabinet 31 can clearly be seen, namely its relatively narrow width compared with existing blast cabinets and which results from the external location of the throwing wheel driving motor 44 and abrasive feed arrangement 59, 63 and 71.

Turning again to FIGS. 1 to 4, the location of the throwing wheel driving motors 44 and abrasive feed arrangements 59, 63 and 71, whereof there are four, can clearly be seen.

Disposed between the motors and the abrasive feed arrangements are workpiece inlet and outlet vestibules, the inlet vestibule 72 being at the driving motor side of the blast cabinet 31 and the outlet vestibule 73 at the abrasive feed side of the blast cabinet 31.

Each vestibule 72, 73 comprises a rectangular casing 74 registering with a rectangular opening (not shown) in the wall 32, 33 of the blast cabinet 31 and closed at the workpiece inlet and outlet ends by rubber flap doors 75A, 75B (see FIG. 2).

It will be seen that, in this embodiment, the work traverse (see arrow A) is across the narrow width of the blast cabinet 31.

The workpiece, which in this instance, may be metal sections or plates (not shown) is pushed manually along a roller conveyor 76 in inlet vestibule 72, across the width of the blast cabinet 31 where it is subjected to shot blast cleaning, and out of exit vestibule 73 by a driven roller conveyor 77 at the exit end of which is an abrasive brush-off tray 78.

At the bottom of the blast cabinet 31 is a screw conveyor 79 extending the length of the blast cabinet 31 and serving to convey spent abrasive and contaminants (debris) from the blast cabinet 31 into the bottom of the separator and dust collector module 30.

A troughed shielding plate 80 overlies the screw conveyor 79 to catch large pieces of debris thus preventing them from striking and damaging the screw conveyor 79. However the plate 80 is of less width than the blast cabinet 31 to permit spent abrasive and smaller debris to fall into the path of action of the screw conveyor 79.

The latter is driven at one end by a geared motor 81 outside the blast cabinet 31, the other end of the screw conveyor 79 being drivingly connected to workpiece exit conveyor 77 by an endless transmission 82, a reduction gear 83 and endless transmissions 84, 85.

As is customary in shot blasting machines, and for this reason not described nor illustrated in detail since such is well known to those skilled in the art, the spent abrasive and contaminants delivered by the screw conveyor 79 into the bottom of the separator and dust collector module are conveyed upwardly by a bucket conveyor 86 driven at its top by a motor 87. The bucket conveyor 86 is housed in a tower 88 at the upper end of which is a tension unit 89 for ensuring the required constant tension in the endless bucket conveyor 86. The buckets 90, on passing over into their downward run, discharge via a duct 88A the spent abrasive and contaminants into a separator 91 where the abrasive and contaminants are separated by, for example, an air wash separator and/or any other separator, for example sieving screen, usually employed in shot blasting machines, the clean shot being deposited by gravity and usually a spreader plate (not shown) into a hopper 92.

An abrasive delivery pipe 93 leads from the bottom of the hopper 92 to the inlet 67 of each abrasive feed funnel 63 for each throwing wheel 37. At the bottom of the hopper 92 is an abrasive flow control valve 94 operated manually by control handles 95 (one for opening the valve and one for closing same).

Fine contaminant is discharged from the separator 92 via a pipe 96 to an appropriate collector, for example, a dust box 97.

A dust collector 98 of any convenient form is connected to the separator tower to suck dust therefrom. The dust collector 98, in this instance, is preferably a filter bag dust collector especially as disclosed in U.S. patent application Ser. No. 022,589 filed Mar. 9, 1987. The dust collector 98 comprises a cabinet 99 with an upper section fan assembly 100 driven by a motor 101, the air discharge duct being indicated at 102. In accordance with the aforesaid Patent Application the filter bags generally indicated at 103 are pleated cloth bags closed at their bottoms and supported in openings in a deck 104 by integrally moulded rigid flanges. A cleaning arrangement for the filter bags 103 is provided and is preferably a pulse jet cleaning system well known to those skilled in the filtration art.

A control panel for the various motors is indicated at CP.

Reference is now made to FIGS. 7 to 9 of the accompanying drawings. For this embodiment parts identical to those in the embodiment of FIGS. 1 to 6 are indicated by the same reference numerals with the suffix "A".

The blast cabinet 31A in this instance is adapted for descaling rod or wire and the passage of the workpiece is longitudinally of the blast cabinet 31A as indicated by arrow B.

There are two abrasive throwing wheels 37A provided with associated driving motors 44A on wall 33A and abrasive feed mechanisms indicated by the reference 63A in this embodiment on wall 32A of the blast chamber 31A.

In this embodiment the throwing wheels are both vertically and longitudinally spaced as can be seen with particular reference to FIG. 7.

Reference is now made to FIGS. 10 to 12 and here again parts which are identical with those of the embodiment of FIGS. 1 to 6 are designated by the same reference numerals with the suffix "B".

In this embodiment the workpieces are presented to the throwing wheels 37B by means of a rotatable table 104. The table 104 is rotatable about a vertical axis by a geared motor 105. The table is enclosed within a casing 106, which casing comprises a top and a bottom joined by a circumferential wall. One half of the table 106A (see FIG. 12) is pivotal about an axis 107 to expose one half of the table for loading the workpieces onto the table and removing the cleaned workpieces therefrom. In use this half 106A of the casing 106 is fastened in position to ensure that the table is fully enclosed.

In this embodiment there are two throwing wheels 37B horizontally aligned and located above the upper surface of the table 104.

The following embodiments disclosed in FIGS. 13 to 17 are concerned with different dispositions of the abrasive throwing wheels for handling different workpieces but all the blast cabinets are characterised as in the previous embodiments by the fact that they are only slightly greater in width than the throwing wheels with the driving motors for the throwing wheels on one major wall of the blast cabinet and the abrasive feed arrangement for the throwing wheels on the parallel opposed wall of the blast cabinet with the driving motors and abrasive feed arrangements being external of the blast cabinet.

For convenience in each of these following embodiments the blast cabinet is designated by the reference 108 and each throwing wheel by the reference 109.

Figure 13:
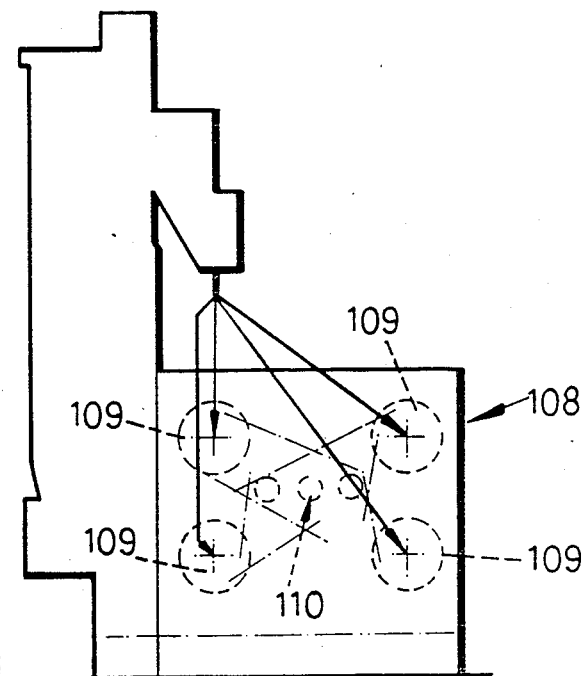
FIGS. 13 to 17 show diagrammatically alternative shot blasting configurations of the shot blasting machine according to the present invention.

Referring to FIG. 13, the blast cabinet 108 mounts four abrasive throwing wheels 109, two down-throwing and two up-throwing.

The machine is designed for small pipe cleaning, the pipes being indicated generally at 110.

In this instance, therefore, the side walls of the blast cabinet are cut-away to provide a passageway for the pipes 110 which pass through abrasive-retaining curtains (not shown) or possibly small vestibules (also not shown) into and out of the blast cabinet 108.

Figure 14:
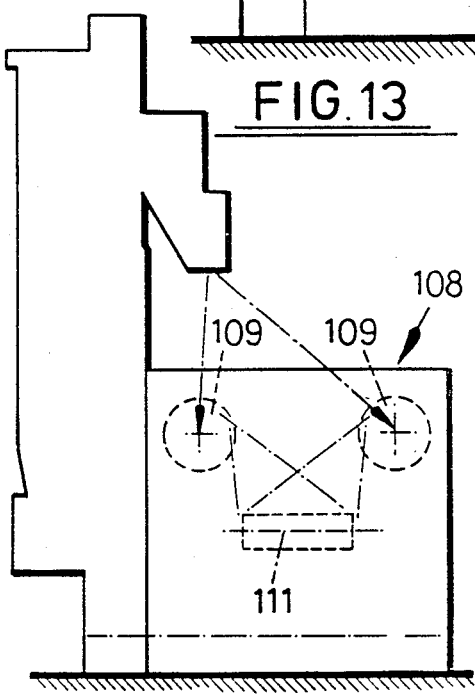
Figure 15:
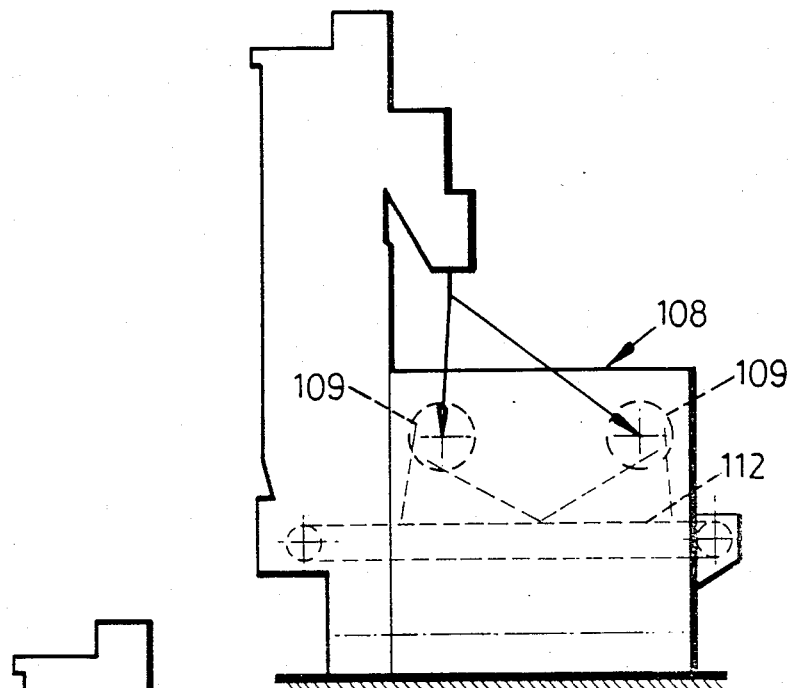

In FIG. 14 there are two down throwing wheels 109 and a belt conveyor 111 for carrying workpieces to be cleaned across the narrow shot-blasting passage of the blast cabinet 108. This belt conveyor 111 will pass through entry and exit vestibules in accordance with the embodiment of FIGS. 1 to 6.

In FIG. 15, there are again two down-throwing wheels 109 and a belt conveyor 112 for the workpieces but, in this instance, the belt conveyor 112 moves along the narrow shot blasting passage as opposed to across it. Again vestibules or curtained openings are provided at the entry and exit to the blast cabinet 108.

Figure 16:
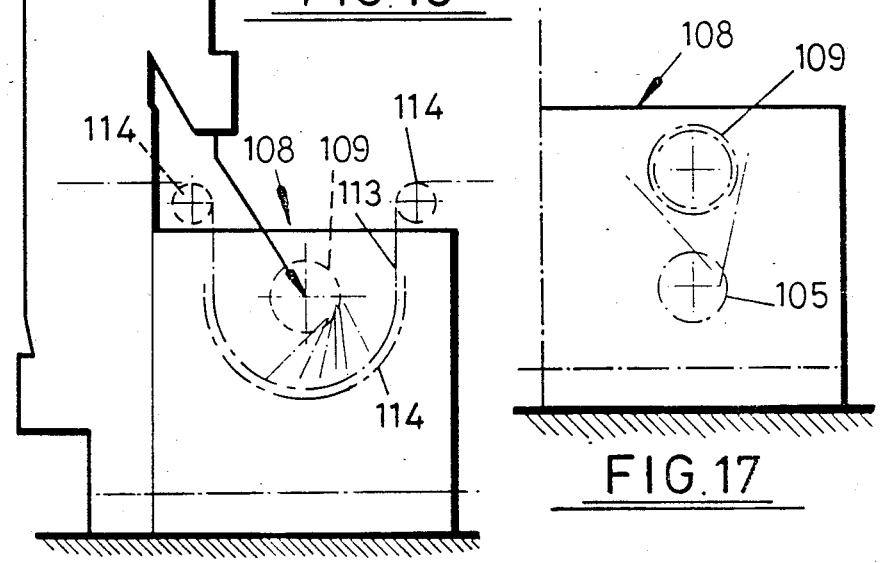

In FIG. 16 there is a single down-throwing wheel 109 and the machine is used to clean chain 113 guided into and out of convenient apertures in the blast cabinet roof by sprockets 114, which apertures are sealed or shielded against abrasive egress by vestibules or curtained openings. A guide or support 114 is provided within the blast cabinet 108 to resist the chain 113 falling to the bottom of the cabinet.

Figure 17:
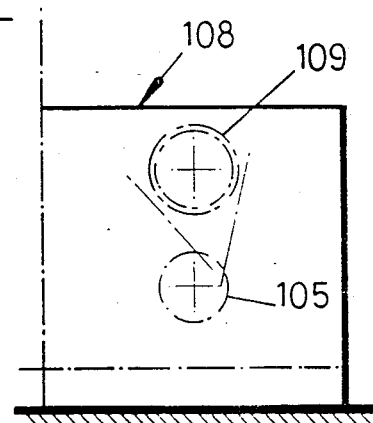

Finally, in FIG. 17, the machine is adapted to clean large diameter pipe ]05, only one up-throwing wheel 109 being provided but the pipe 35 being rotated about its axis as it is moved axially across the narrow shot blast cabinet.

The above are some of the adaptations of the shot blasting machine according to the present invention. These are not exhaustive.

It is to be noted that a single blast cabinet may be provided with more than one workpiece entry and exit configuration. For example, the blast cabinet of FIGS. 10 to 12 which incorporates a rotatable workpiece supporting table may be provided additionally with a transverse workpiece passage across the width of the blast cabinet as indicated in FIG. 13. Such a blast cabinet would be particularly useful for those involved in the scaffolding industry in that the scaffolding couplings could be cleaned by using the rotatable table workpiece supporting facility while the scaffolding tubes could be cleaned by being passed across and through the width of the blast cabinet through appropriate vestibules or curtained openings in the blast cabinet walls.

A blast cabinet according to the present invention can also have its workpiece presentation configuration readily changed by, for example, blanking off entry and exit vestibules or curtained openings allowing passage of a workpiece across the width of the blast cabinet by means of plates and cutting openings in say the end walls of the blast cabinet and providing these with vestibules or curtains preventing abrasive egress in the end walls of the blast cabinet.

Thus, by providing appropriate openings and blanking plates the versatility of a single blast cabinet is substantially increased.

A shot blasting machine according to the present invention is a frugal user of energy during operation as a result of the direct coupled electric motors to the throwing wheels and the economy of the integrated abrasive recycling system (separation and dust collector). The machine is, as aforesaid, of a modular construction enabling a variety of blast cabinets to be attached to the throwing wheels and the abrasive separation and recovery equipment.

The shot blasting machine is compact requiring little headroom and floor space and pitless foundations.

The high efficiency dust collector which is integrated with the abrasive and contaminant separation system saves space, ducting and installation costs and provides a clean working environment for the operator.

The shot blasting machine can be used, inter alia, for cleaning prior to subsequent surface preparation, removing scale and rust, treating weldments and steel forgings, preparing surfaces for bondings and coating and cosmetic cleaning.

The machine can be employed to clean and prepare, inter alia, steel profiles, plates, bar, pipes, billets, trays, panels, masts, playground structures, scaffolding, re-bar and metal, wood and plastic strips.

I claim:

1. A shot blasting machine comprising a blast cabinet having first and second opposed walls defining a width joined by third and fourth opposed walls defining a length which define a blasting space for receiving a workpiece to be blasted and, in adjacent and communicating relationship with the blasting space, a space for enclosing an abrasive throwing wheel for use in blasting a workpiece within the blasting space with abrasive, the blasting cabinet including the blasting space and the wheel space having substantially constant cross-sectional dimension along the length and width of the blast cabinet, said wheel space defining the width of the cabinet to be only slightly larger than the width of the abrasive throwing wheel, the first and second opposed walls defining passage means through which a workpiece can be fed into and out of the blasting space, the abrasive throwing wheel disposed within the wheel space between said first and second walls comprising a single backplate disposed adjacent said first wall and having integral throwing blades surrounding an integral central vaned impellor, a driving motor mounted externally of said first wall and coupled directly to the backplate of the abrasive throwing wheel through said first wall to rotate the abrasive throwing wheel, a control cage fixedly mounted externally of said second wall which defined an opening through which the control cage projects to surround the vaned impellor of the rotatable abrasive throwing wheel, and abrasive feed delivery means also mounted externally of said second wall and communicated through said opening with the control cage inwardly of said second wall to deliver abrasive thereto and consequently to the vaned impellor of the rotatable abrasive throwing wheel.

2. A machine as claimed in claim 1, in which the throwing wheel backplate has an integral annular formation on its side adjacent said first wall which defines an opening through which a driving shaft of the driving motor passes to engage in and be fastened to the annular formation.

3. A machine as claimed in claim 1, in which the driving motor is bolted to the outside of said first wall of the blast cabinet.

4. A machine as claimed in claim 2, comprising an annular plate overlying said opening in said first wall opening and to which the driving motor is bolted, and a sealing ring between the internal diameter of said plate and the motor driving shift to prevent abrasive egress.

5. A machine as claimed in claim 1 comprising an inwardly directed annular flange on said first wall spatially surrounding the annular formation on the throwing wheel to provide a labyrinth passage to resist abrasive egress through said opening in said first wall.

6. A machine as claimed in claim 1, in which the control cage is secured to a plate by a releasable clamp, which plate defines an aperture to permit entry of the control cage into the blast cabinet, the aperture in the plate overlying said opening in said second wall.

7. A machine as claimed in claim 1, in which the abrasive delivery means includes a feed funnel in communication with a feed spout, the feet funnel being external of the blast cabinet with the feed spout extending through said first wall opening to connect the feed funnel with the interior of the control cage.

8. A machine as claimed in claim 7, in which the feed funnel is bolted to the control cage mounting plate and to the feed spout.

9. A machine as claimed in claim 1, comprising vestibules secured to and external of said first and second walls for entry and exit of a workpiece through the passage means.

10. A machine as claimed in claim 1, comprising curtains on said first and second walls at the passage means.

11. A machine as claimed in claim 1 in which the blast cabinet is a module connected to an abrasive/contaminant separator module, the blast cabinet module communicating at its bottom with the separator module for delivery to said separator module of spent abrasive and contaminants.

12. A machine as claimed in claim 11, in which a rotatable feed screw is provided in the bottom of the blast cabinet module for conveying the spent abrasive and contaminants into the separator module.

13. A machine as claimed in claim 11, in which the separator module has a hopper located above the blast cabinet module for receiving cleaned abrasive which is returned to each abrasive feed funnel by a depending pipe.

14. A machine as claimed in claim 13, in which the hopper has at its lower end a flow control valve operable from below by depending control handles.

15. A machine as claimed in claim 1, in which the separator module incorporates a dust collector.

16. A machine as claimed in claim 15, in which the dust collector is a filter bag unit.

17. A slot blasting machine comprising a blast cabinet having first and second opposed walls defining a width joined by third and fourth opposed walls defining a length which define a blasting space for receiving a workpiece to be blasted and, in adjacent and communicating relationship with the blasting space, a space for enclosing an abrasive throwing wheel for use in blasting a workpiece with in the blasting space with abrasive, the blasting cabinet including the blasting space and the wheel space having substantially constant cross-sectional dimension along the length and width of the blast cabinet, said wheel space defining the width of the cabinet to be only slightly larger than the width of the abrasive throwing wheel, the third and fourth opposed walls defining passage means through which a workpiece can be fed into and out of the blasting space, the abrasive throwing wheel disposed within the wheel space between said first and second walls comprising a single backplate disposed adjacent said first wall and having integral throwing blades surrounding an integral central vaned impellor, a driving motor mounted externally of said first wall and coupled directly to the backplate of the abrasive throwing wheel through said first wall to rotate the abrasive throwing wheel, a control cage fixedly mounting externally of said second wall which defines an opening through which the control cage projects to surround the vaned impellor of the rotatable abrasive throwing wheel, and abrasive feed delivery means also mounted externally of said second wall and communicating through said opening with the control cage inwardly of said second wall to deliver abrasive thereto and consequently to the vaned impellor of the rotatable abrasive throwing wheel.

18. A shot blasting machine comprising; a blast cabinet having first and second opposed walls defining a width joined by third and fourth opposed walls defining a width which define a blasting space for receiving a workpiece to be blasted and, in adjacent and communicating relationship with the blasting space, a space for enclosing an abrasive throwing wheel for use in blasting a workpiece within the blasting space with abrasive, the blasting cabinet including the blasting space and the wheel space having substantially constant cross-sectional dimension along the length and width of the blast cabinet, said wheel space defining the width of the cabinet to be only slightly larger than the width of the abrasive throwing wheel, a rotating table having an axis of rotation within the space and serving to support and move a workpiece within the blasting space, an openable casing fixed to said first and second walls to enclose the rotating table during a blasting operation, the abrasive throwing wheel disposed within the blasting space between said first and second walls comprising a single backplate disposed adjacent said first wall and having integral throwing blades surrounding an integral central vaned impellor, a driving motor mounted externally of said first wall and coupled directly to the backplate of the abrasive throwing wheel through said first wall to rotate the abrasive throwing wheel, a control cage fixedly mounted externally of said second wall which defines an opening through which the control cage projects to surround the vaned impellor of the rotatable abrasive throwing wheel, and abrasive feed delivery means also mounted externally of said second wall and communicating through said opening with the control cage inwardly of said second wall to deliver abrasive thereto and consequently to the vaned impellor of the rotatable abrasive throwing wheel.

* * * * *

UNITED STATES PATENT AND TRADEMARK OFFICE
CERTIFICATE OF CORRECTION

PATENT NO. : 4,907,379

DATED : Mar. 13, 1990

INVENTOR(S) : William R. MacMillan

It is certified that error appears in the above—identified patent and that said Letters Patent is hereby corrected as shown below:

Column 6, Line 59, change "defined" to -- defines --;

Column 6, Line 63, change "communicated" to -- communicating --;

Column 7, Line 13, change "1" to -- 2 --;

Column 7, Line 25, change "feet" to -- feed --;

Column 8, Line 3, change "with in" to -- within --;

Column 8, Line 29, delete ";" after comprising;

Column 8, Line 43, insert -- wheel -- before space.

Signed and Sealed this

Second Day of July, 1991

*Attest:*

HARRY F. MANBECK, JR.

*Attesting Officer*

Commissioner of Patents and Trademarks